United States Patent
Kawamura

(10) Patent No.: US 10,422,022 B2
(45) Date of Patent: *Sep. 24, 2019

(54) METHOD FOR PRODUCING TUNGSTEN

(71) Applicant: JX NIPPON MINING & METALS CORPORATION, Tokyo (JP)

(72) Inventor: Toshifumi Kawamura, Hitachi (JP)

(73) Assignee: JX NIPPON MINING & METALS CORPORATION, Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 15/563,144

(22) PCT Filed: Mar. 28, 2016

(86) PCT No.: PCT/JP2016/059969
§ 371 (c)(1),
(2) Date: Sep. 29, 2017

(87) PCT Pub. No.: WO2016/158877
PCT Pub. Date: Oct. 6, 2016

(65) Prior Publication Data
US 2018/0080101 A1   Mar. 22, 2018

(30) Foreign Application Priority Data
Mar. 31, 2015 (JP) .................. 2015-071892

(51) Int. Cl.
C25C 3/34 (2006.01)
C25C 3/00 (2006.01)
(Continued)

(52) U.S. Cl.
CPC .............. *C22B 34/36* (2013.01); *C22B 3/045* (2013.01); *C22B 3/16* (2013.01); *C22B 7/006* (2013.01);
(Continued)

(58) Field of Classification Search
CPC .... C25C 1/00; C25C 7/02; C25C 1/22; C25C 3/34; C25C 7/00
(Continued)

(56) References Cited

U.S. PATENT DOCUMENTS

| 4,374,008 A * | 2/1983 | Natansohn ........... C01G 41/003 |
| | | 205/571 |
| 6,524,366 B1 * | 2/2003 | Seegopaul ............. B82Y 30/00 |
| | | 148/217 |
| 9,656,873 B2 * | 5/2017 | Mehrotra .............. C01B 32/949 |

FOREIGN PATENT DOCUMENTS

| JP | 2011-032578 A | 2/2011 |
| JP | 2011-047013 A | 3/2011 |

(Continued)

OTHER PUBLICATIONS

English translation of the International Preliminary Report on Patentability and Written Opinion of the International Searching Authority (Forms PCT/IB/338, PCT/IB/373 and PCT/ISA/237) issued in International Application No. PCT/JP2016/059969 dated Oct. 12, 2017.

(Continued)

*Primary Examiner* — Zulmariam Mendez
(74) *Attorney, Agent, or Firm* — Birch, Stewart, Kolasch & Birch, LLP

(57) ABSTRACT

Provided is a method for efficiently producing tungsten from a raw material mixture comprising at least one valuable containing tungsten. The present invention relates to a method for producing tungsten, comprising the steps of subjecting a raw material mixture comprising at least one valuable containing tungsten to electrolysis using an organic electrolytic solution to dissolve tungsten in the electrolytic solution; and calcining the electrolytic solution containing dissolved tungsten at a temperature of less than 800° C. to obtain tungsten.

20 Claims, 2 Drawing Sheets

(51) Int. Cl.
　　　*C25C 1/00*　　　(2006.01)
　　　*C25C 7/00*　　　(2006.01)
　　　*C22B 34/36*　　(2006.01)
　　　*C25C 1/06*　　　(2006.01)
　　　*C25C 7/02*　　　(2006.01)
　　　*C25C 7/06*　　　(2006.01)
　　　*C22B 3/04*　　　(2006.01)
　　　*C22B 3/16*　　　(2006.01)
　　　*C22B 7/00*　　　(2006.01)
　　　*C25C 1/08*　　　(2006.01)
　　　*C25C 1/10*　　　(2006.01)

(52) U.S. Cl.
　　　CPC .................. *C25C 1/06* (2013.01); *C25C 1/08* (2013.01); *C25C 1/10* (2013.01); *C25C 7/02* (2013.01); *C25C 7/06* (2013.01); *Y02P 10/234* (2015.11)

(58) Field of Classification Search
　　　USPC ................................................ 205/560, 371
　　　See application file for complete search history.

(56) References Cited

FOREIGN PATENT DOCUMENTS

| | | |
|---|---|---|
| JP | 2013-194269 A | 9/2013 |
| JP | 5329615 B2 | 10/2013 |
| JP | 2014-129583 A | 7/2014 |
| JP | 2014-173157 A | 9/2014 |
| JP | 2015-59068 A | 3/2015 |
| KR | 84-001046 B1 | 7/1984 |

OTHER PUBLICATIONS

International Search Report for PCT/JP2016/059969 (PCT/ISA/210) dated Apr. 26, 2016.
Written Opinion of the International Searching Authority for PCT/JP2016/059969 (PCT/ISA/237) dated Apr. 26, 2016.
Extended European Search Report for corresponding European Application No. 16772758.5, dated Sep. 19, 2018.

* cited by examiner

METHOD FOR PRODUCING TUNGSTEN

TECHNICAL FIELD

The present invention relates to a method for producing tungsten.

BACKGROUND ART

A recovery method of metals usually involves a process of crushing scrap containing the metals and dissolving them in an alkaline solution. However, in the recovery of tungsten, applying such a conventional process is very difficult because tungsten is a very hard and highly chemical resistant metal. Therefore, it is a common method in the art that tungsten is oxidized by a strong treatment with alkali molten salts or the like to dissolve and recover tungsten (Patent Document 1, Patent Document 2 and the like).

In the common method, a tungsten-used target and an end material are originally high purity, so that the use of the molten salt treatment or pulverization which is the general treatment as described above will lead to significant reduction of purity. Therefore, in order to provide tungsten with high purity, multistage purification, ion exchange treatment and the like will be required, thereby leading to complicated treating steps.

Electrolysis is known as the method for dissolving tungsten. To recover tungsten with high purity, ammonium nitrate that is an inorganic solution would be considered to be used for the electrolytic solution. However, it is necessary to separately add ammonia to adjust a pH of the electrolytic solution in order to carry out alkaline electrolysis.

However, ammonium nitrate itself increases a risk of explosion at high concentration. It is thus necessary to control the concentration of ammonium nitrate during electrolysis. Furthermore, since ammonia also has a concentration change due to volatilization in an electrolysis temperature range, concentration control and the like are necessary, so that running costs are required for recovery equipment, control equipment and the like. In addition, an impurity-free treating method is required for the recovery of tungsten from materials having originally high purity, such as used targets and end materials.

To solve the above problems, the present inventors previously found that tungsten with high purity could be recovered with a low cost by carrying out electrolysis using an alcohol amine-containing electrolytic solution (Patent Document 3).

CITATION LIST

Patent Literature

Patent Document 1: Japanese Patent Application Laid-Open Publication No. 2011-047013 A1
Patent Document 2: Japanese Patent Application Laid-Open Publication No. 2013-194269 A1
Patent Document 3: Japanese Patent No. 5329615 B1

SUMMARY OF THE INVENTION

Technical Problem

Patent Document 3 produces $WO_3$ or W having high purity by converting a tungsten component into a hydroxide by electrolysis of a raw material mixture to dissolve the hydroxide in an electrolytic solution, concentrating the hydroxide to form a tungstate salt compound and optionally heating and reducing the compound. However, there still remains a need for a method of efficiently producing tungsten from the raw material mixture comprising at least one valuable containing tungsten.

Therefore, an object of the present invention is to provide a method for efficiently producing tungsten from a raw material mixture comprising at least one valuable containing tungsten.

Solution to Problem

As a result of intensive studies to solve the above problems, the present inventors have found that tungsten can be efficiently produced by subjecting a raw material mixture comprising at least one valuable containing tungsten to electrolysis using an organic electrolytic solution to dissolve tungsten in the electrolytic solution and then calcining it at a controlled temperature.

In one aspect, the present invention completed on the basis of the above findings provides a method for producing tungsten, comprising the steps of subjecting a raw material mixture comprising at least one valuable containing tungsten to electrolysis using an organic electrolytic solution to dissolve tungsten in the electrolytic solution; and calcining the electrolytic solution containing dissolved tungsten at a temperature of less than 800° C. to obtain tungsten.

In an embodiment of the method for producing tungsten according to the present invention, the organic electrolytic solution may be an organic alkaline electrolytic solution.

In another embodiment of the method for producing tungsten according to the present invention, the organic alkaline electrolytic solution may contain at least one alcohol amine.

In a further embodiment of the method for producing tungsten according to the present invention, the at least one alcohol amine may be monoethanolamine and/or triethanolamine.

In yet another embodiment of the method for producing tungsten according to the present invention, the raw material mixture may contain from 1 to 30% by mass of at least one valuable other than tungsten.

In yet another embodiment of the method for producing tungsten according to the present invention, the raw material mixture may contain from 1 to 10% by mass of at least one valuable other than tungsten.

In yet another embodiment of the method for producing tungsten according to the present invention, the raw material mixture may contain from 3 to 10% by mass of at least one valuable other than tungsten.

In yet another embodiment of the method for producing tungsten according to the present invention, the electrolysis may be carried out by adjusting a temperature of the electrolytic solution to 20 to 80° C.

In yet another embodiment of the method for producing tungsten according to the present invention, the electrolytic solution may have a pH of 7 or more.

In a further embodiment of the method for producing tungsten according to the present invention, tungsten carbide may be obtained simultaneously with the tungsten in the step of calcining the electrolytic solution containing dissolved tungsten at the temperature of less than 800° C. to obtain tungsten.

In yet another embodiment of the method for producing tungsten according to the present invention, after the step of dissolving tungsten in the electrolytic solution, the electrolytic solution may be subjected to preliminary heating to reduce water content, and then carrying out the calcining step to obtain tungsten.

In a further embodiment of the method for producing tungsten according to the present invention, an anode used for the electrolysis may be a titanium basket provided with the raw material mixture containing the at least one valuable containing tungsten.

Advantageous Effects of Invention

According to the present invention, it is possible to provide a method for efficiently producing tungsten from a raw material mixture comprising at least one valuable containing tungsten.

DESCRIPTION OF EMBODIMENTS

Hereinafter, embodiments of the method for producing tungsten according to the present invention will be described in detail.

First, a raw material mixture to be treated is prepared, which contains at least one valuable containing tungsten. Examples of the raw material mixture containing the at least one valuable containing tungsten include so-called tungsten recycled materials obtained by pulverizing tungsten scrap and the like. For example, the raw material mixture containing the at least one valuable containing tungsten to be treated according to the present invention may contain from 0 to 15% by mass of Co, from 0 to 5% by mass of Ni, from 0 to 5% by mass of Fe, from 0 to 5% by mass of Ti, and form 0 to 15% by mass of Ta, and have the tungsten content of from 3 to 95% by mass. Further, the raw material mixture containing the at least one valuable containing tungsten to be treated according to the present invention may contain from 1 to 30% by mass of at least one valuable other than tungsten, or from 1 to 10% by mass of at least one valuable other than tungsten, or from 3 to 10% by mass of at least one valuable other than tungsten.

Then, an electrolytic bath provided with an anode, a cathode and an electrolytic solution is prepared, and the bath is used to carry out electrolysis of the raw material mixture containing the at least one valuable containing tungsten.

Figure 1:
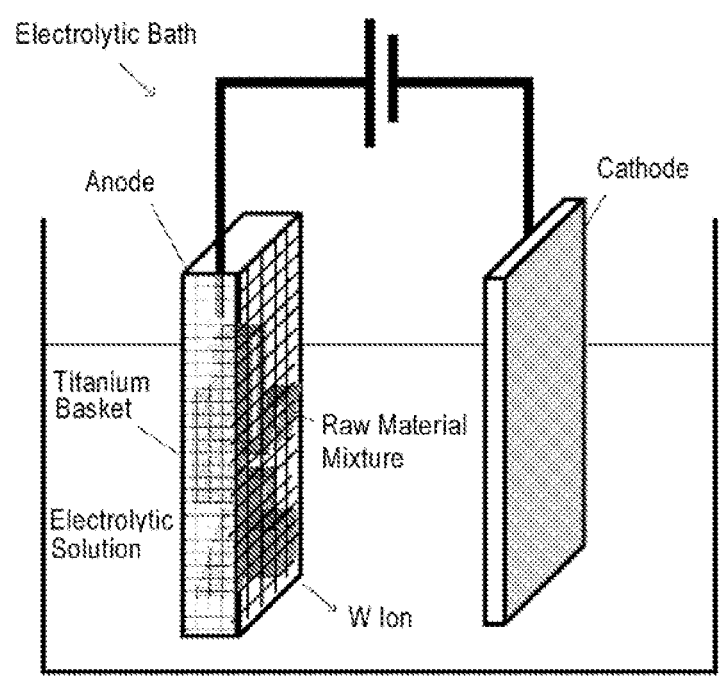
FIG. 1 is a schematic view of an example of an electrolytic bath according to an embodiment of the present invention.

The electrolytic bath is not particularly limited, but may be, for example, the configuration as shown in FIG. 1. In FIG. 1, a titanium basket is used as the anode, and the raw material mixture containing the at least one valuable containing tungsten is provided in the titanium basket. The titanium basket is preferable in that it is stable under high voltage, high current and high temperature electrolytic processing conditions of the present invention.

The electrolytic solution employs an organic electrolytic solution. The organic electrolytic solution may be preferably an alkaline electrolytic solution, and more preferably may contain at least one alcohol amine.

Further, the electrolytic solution that can be used includes an electrolytic solution containing an alcohol amine having 1 or more and less than 6 carbon atoms. The alcohol amine having 1 or more and less than 6 carbon atoms may be one or more selected from the group consisting of methanolamine, ethanolamine, propanolamine, butanolamine, pentanolamine, dimethanolamine, diethanolamine, trimethanolamine, methylmethanolamine, methylethanolamine, methylpropanolamine, methylbutanolamine, ethylmethanolamine, ethylethanolamine, ethylpropanolamine, dimethylmethanolamine, dimethylethanolamine, dimethylpropanolamine, methyldimethanolamine, methyldiethanolamine and diethylmethanolamine.

In particular, the use of the electrolytic solution containing the alcohol amine having 1 or more and less than 6 carbon atoms can allow tungsten to be produced with good efficiency and yield when carrying out a subsequent calcining step of a tungstate solution.

Further, the electrolytic solution that can be used for the present invention includes an electrolytic solution containing an alcohol amine having 6 carbon atoms, which is one or more selected from the group consisting of hexanolamine, dipropanolamine, triethanolamine, methylpropanolamine, ethylbutanolamine, propylpropanolamine, butylethanolamine, pentylmethanolamine, dimethylbutanolamine, diethylethanolamine, methylethylpropanolamine, methylpropylethanolamine and ethylpropylmethanolamine. Thus, the use of the electrolytic solution containing the alcohol amine having 6 carbon atoms can allow tungsten to be produced with good efficiency and yield when carrying out the subsequent calcining step of the tungstate solution.

Further, when the alcohol amine is used in the electrolytic solution as described above, the treatment reaction system of electrolysis does not contain impurities such as Na, K, Fe and S, so that tungsten having high purity can be recovered. Further, tungsten having purity of 4N or more can be obtained from the recycled materials and the like. In addition, the electrolytic solution has high voltage endurance and is stable, and also has low pH dependency, so that easy controlling of electrolysis can be achieved, and the electrolytic solution does not need supplement due to volatilization that will be required when the electrolytic solution is ammonia, so that a low cost processing can be achieved. Although a clear reason why the alcohol amine electrolytic solution has high voltage endurance and is stable is not known, the reason would be possibly because the electrolytic solution is stabilized by coordinating the dissolved tungsten with the alcohol amine.

The concentration of the alcohol amine in the electrolytic solution may be preferably from 1 to 80% by mass. If the concentration of the alcohol amine in the electrolytic solution is less than 1% by mass, conductivity will excessively decreased and electrolysis will become unstable, so that complex formation may be difficult. If the concentration of the alcohol amine in the electrolytic solution is more than 80% by mass, solubility in water will be exceeded depending on the type of the electrolytic solution and the concentration will be unnecessarily increased, which will be disadvantageous in terms of costs. The concentration of the alcohol amine in the electrolytic solution may be more preferably from 2 to 50% by mass, and still more preferably from 5 to 40% by mass, and still more preferably from 5 to 20% by mass.

The temperature of the electrolytic solution during electrolysis may be adjusted to 20 to 80° C. to carry out the electrolysis. The temperature of the electrolytic solution of 20 to 80° C. may stabilize the alcohol amine and satisfactorily suppress volatilization of the alcohol amine. Therefore, the points where the electrolytic solution does not volatilize and is stable and has few impurities in the electrolysis reaction are very advantageous for the processes of recovering tungsten having high purity and separating and recovering other valuables, in terms of a total cost. The temperature of the electrolytic solution may be more preferably set to an elevated temperature of 60° C. or higher in terms of the electrolysis rate. For example, ammonia aggressively volatilizes at 50° C. or higher and requires a large amount of supplement, but the alcohol amine based electrolytic solution has a higher boiling point and is hard to volatilize, so that the alcohol amine based electrolytic solution can be used at 60° C. or higher without any problem.

The pH of the electrolytic solution may be preferably 7 or more. If the pH is less than 7, a produced tungstate ion will become difficult to be dissolved, and will be precipitated as $WO_3$ or $H_2WO_4$, and as a result, electrolytic dissolution may be inhibited. More preferably, the electrolytic solution may be adjusted such that the electrolytic solution is weakly alkaline with a pH of 10 or more, for example.

Figure 2:
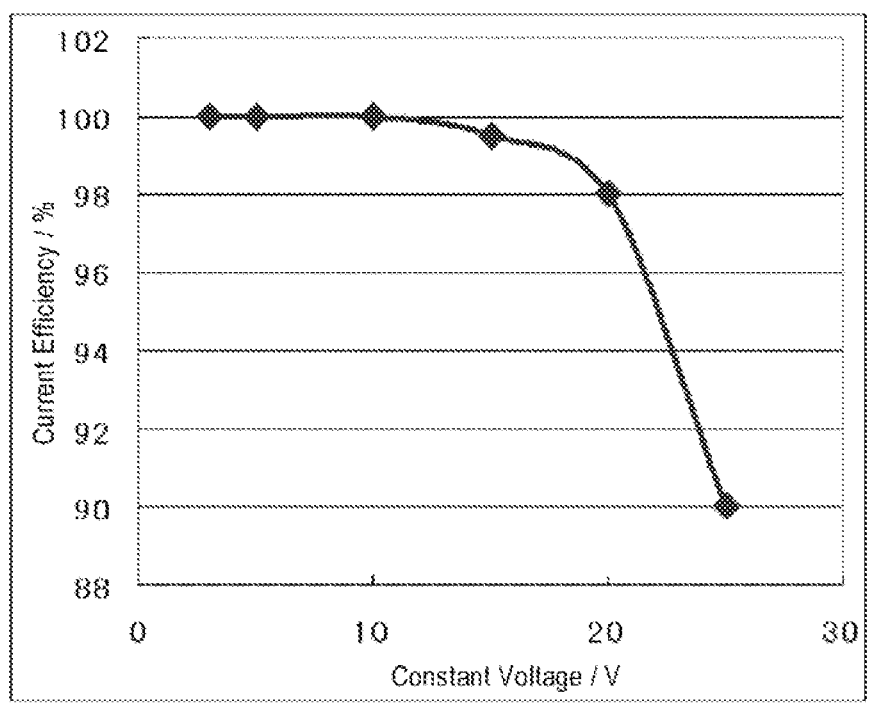
FIG. 2 is a diagram showing a relationship between constant voltage and current efficiency in electrolysis.

The alcohol amines used in the electrolytic solution have high voltage endurance and high current density resistance. For high productivity, higher set voltage and higher set current density in electrolysis is preferred, but practically, the set voltage may be 20 V or less and the set current density may be 500 A/dm$^2$ in view of limitations of facilities and damages to the cathode side. As a reference, FIG. 2 shows the relationship between constant voltage and current efficiency in the electrolysis.

Thus, by conducting electrolysis of the raw material mixture containing the at least one valuable containing tungsten using the electrolyte solution containing the alcohol amine, tungsten can be dissolved in the electrolytic solution while at the same time electrodepositing a part of the valuable(s) onto the cathode used for the electrolysis. Further, the at least one valuable other the valuable(s) electrodeposited onto the cathode by the electrolysis can be a residue in the electrolytic solution. Thus, the tungsten component in a certain form and other valuable can be separated and recovered at once from the raw material mixture containing tungsten and the other valuable.

Tungsten is produced by calcining the electrolytic solution in which the tungsten component has been dissolved. Further, it is preferred in terms of production efficiency that after the step of dissolving tungsten in the electrolytic solution, the electrolytic solution is subjected to preliminary heating, for example at 150 to 200° C., to decrease the water content, and then calcined to produce tungsten. The calcination may be preferably carried out in a reducing atmosphere such as hydrogen, argon, nitrogen or the like, and more preferably in the hydrogen atmosphere.

In the calcining step, the calcining temperature is controlled to be less than 800° C. By controlling the calcining temperature in this way, the remaining of carbon in the alcohol amine compound is suppressed and the reaction of carbon with tungsten is suppressed, thereby producing tungsten with good yield. The calcining temperature may be preferably 500° C. or more and less than 800° C. If the calcining temperature is less than 500° C., the reduction reaction may be very slow.

In the method for producing tungsten according to the present invention, tungsten carbide may be produced together with tungsten after calcination. The ratio of the yields of tungsten carbide to tungsten produced can be adjusted by controlling the calcining temperature. According to the present invention, an increased amount of tungsten is generated by controlling the calcining temperature to a lower calcining temperature and an increased amount of tungsten carbide is generated by controlling the calcining temperature to a higher calcining temperature, in a rage of less than 800° C. for the calcining temperature.

According to the method for producing tungsten of the present invention, tungsten and optionally tungsten carbide may be directly produced by calcining the electrolytic solution itself in which the tungsten component has been dissolved. Therefore, the method according to the present invention has very good production efficiency as compared with the conventional method (as described in Patent Document 3) in which the tungsten component is dissolved in the electrolytic solution as a hydroxide by electrolysis of the raw material mixture, the hydroxide is concentrated to form a tungstate salt compound and the salt compound is optionally heated and reduced.

On the other hand, the valuable electrodeposited onto the cathode used for electrolysis may be one or more selected from the group consisting of cobalt, nickel, iron, chromium and vanadium, for example. These valuables can be separated from tungsten that can be easily dissolved in the electrolytic solution, and other residue, by a known method such as controlling of the pH in the acid-leaching to an alkaline side. Further, when the cathode used for electrolysis is made of, for example, titanium, stainless steel, iridium, niobium or zirconium, the above cobalt, nickel, iron or like can be satisfactorily electrodeposited, which is preferred.

The at least one valuable that is the residue in the electrolytic solution may be, for example, one or more selected from the group consisting of titanium, tantalum and silica. These valuables are electrolytically inactive, so that they can be easily separated as the residue without special treatment.

In another aspect, the present invention provides a method for producing a tungstate solution, comprising subjecting a raw material mixture comprising at least one valuable containing tungsten to electrolysis using an electrolytic solution containing an alcohol amine having 1 or more and less than 6 carbon atoms to dissolve tungsten in the electrolytic solution. By subjecting the raw material mixture containing the at least one valuable containing tungsten to electrolysis using the electrolytic solution containing the alcohol amine having 1 or more and less than 6 carbon atoms, the tungstate solution that can produce tungsten with good efficiency and yield can be obtained.

EXAMPLE

Hereinafter, Examples of the present invention will be described, but the Examples are merely for the purpose of illustration and are not intended to limit the present invention.

Example 1

10 kg of super hard material scrap having the contents as shown in Table 1 was placed in a titanium basket to prepare an anode for an electrolytic bath.

A titanium plate was used as a cathode for the electrolytic bath. 10% by mass of monoethanolamine was used as an electrolytic solution which was prepared by adding pure water to the monoethanolamine to bring about 20 L. Electrodissolution was carried out at a current density of 5 A/dm$^2$ and a constant current of 100 A at a temperature of 70° C. for 10 hours.

As a result, metallic cobalt was deposited on the surface of the titanium plate of the cathode. Further, tungsten was dissolved in the electrolytic solution, and a residue was generated in the electrolytic solution. In addition, the amount of tungsten dissolved was 0.6 kg, and the current efficiency was substantially 100%.

The electrolytic solution containing dissolved tungsten was then preheated at 200° C. to reduce water content, and then calcined in a hydrogen atmosphere at 780° C. XRD demonstrated that 90% of tungsten was produced and 10% of tungsten carbide was produced.

TABLE 1

| W mass % | Co mass % | Ni mass % | Ta mass % | Fe mass % |
|---|---|---|---|---|
| 80 | 12 | 1 | 2 | 1 |

Example 2

5 kg of super hard material scrap having the contents as shown in Table 1 was placed in a titanium basket to prepare an anode for an electrolytic bath.

A titanium plate was used as a cathode for the electrolytic bath.

% by mass of monoethanolamine was used as an electrolytic solution which was prepared by adding pure water to the monoethanolamine to bring about 10 L. Electrodissolution was carried out at a current density of 10 $A/dm^2$ and a constant current of 100 A at a temperature of 70° C. for 10 hours.

As a result, metallic cobalt was deposited on the surface of the titanium plate of the cathode. Further, tungsten was dissolved in the electrolytic solution, and a residue was generated in the electrolytic solution. In addition, the amount of tungsten dissolved was 1.1 kg, and the current efficiency was substantially 100%.

The electrolytic solution containing dissolved tungsten was then preheated at 200° C. to reduce water content, and then calcined in a hydrogen atmosphere at 700° C. XRD demonstrated that 90% of tungsten was produced and 10% of tungsten carbide was produced.

TABLE 2

| W mass % | Co mass % | Ni mass % | Ta mass % | Fe mass % |
|---|---|---|---|---|
| 70 | 10 | 1 | 10 | 1 |

Comparative Example 1

The same material was used and treated in the same method as in Example 1, with the exception that the calcining temperature in the hydrogen atmosphere was 1000° C. XRD demonstrated that 90% of tungsten carbide was produced and 10% of tungsten was produced.

What is claimed is:

1. A method for producing tungsten, comprising the steps of:
   subjecting a raw material mixture comprising at least one valuable containing tungsten to electrolysis using an organic electrolytic solution to dissolve tungsten in the electrolytic solution; and
   calcining the electrolytic solution containing dissolved tungsten at a temperature of less than 800° C. to obtain tungsten.

2. The method for producing tungsten according to claim 1, wherein the organic electrolytic solution is an organic alkaline electrolytic solution.

3. The method for producing tungsten according to claim 2, wherein the organic alkaline electrolytic solution contains at least one alcohol amine.

4. The method for producing tungsten according to claim 3, wherein the at least one alcohol amine is monoethanolamine and/or triethanolamine.

5. The method for producing tungsten according to claim 1, wherein the raw material mixture contains from 1 to 30% by mass of at least one valuable other than tungsten.

6. The method for producing tungsten according to claim 5, wherein the raw material mixture contains from 1 to 10% by mass of at least one valuable other than tungsten.

7. The method for producing tungsten according to claim 6, wherein the raw material mixture contains from 3 to 10% by mass of at least one valuable other than tungsten.

8. The method for producing tungsten according to claim 1, wherein the electrolysis is carried out by adjusting a temperature of the electrolytic solution to 20 to 80° C.

9. The method for producing tungsten according to claim 2, wherein the electrolytic solution has a pH of 7 or more.

10. The method for producing tungsten according to claim 1, wherein tungsten carbide is obtained simultaneously with the tungsten in the step of calcining the electrolytic solution containing dissolved tungsten at the temperature of less than 800° C. to obtain tungsten.

11. The method for producing tungsten according to claim 1, wherein after the step of dissolving tungsten in the electrolytic solution, the electrolytic solution is subjected to preliminary heating to reduce water content, and then carrying out the calcining step to obtain tungsten.

12. The method for producing tungsten according to claim 1, wherein an anode used for the electrolysis is a titanium basket provided with the raw material mixture containing the at least one valuable containing tungsten.

13. The method for producing tungsten according to claim 2, wherein the raw material mixture contains from 1 to 30% by mass of at least one valuable other than tungsten.

14. The method for producing tungsten according to claim 3, wherein the raw material mixture contains from 1 to 30% by mass of at least one valuable other than tungsten.

15. The method for producing tungsten according to claim 4, wherein the raw material mixture contains from 1 to 30% by mass of at least one valuable other than tungsten.

16. The method for producing tungsten according to claim 2, wherein the electrolysis is carried out by adjusting a temperature of the electrolytic solution to 20 to 80° C.

17. The method for producing tungsten according to claim 3, wherein the electrolysis is carried out by adjusting a temperature of the electrolytic solution to 20 to 80° C.

18. The method for producing tungsten according to claim 4, wherein the electrolysis is carried out by adjusting a temperature of the electrolytic solution to 20 to 80° C.

19. The method for producing tungsten according to claim 5, wherein the electrolysis is carried out by adjusting a temperature of the electrolytic solution to 20 to 80° C.

20. The method for producing tungsten according to claim 6, wherein the electrolysis is carried out by adjusting a temperature of the electrolytic solution to 20 to 80° C.

* * * * *